F. AUFINGER.
ANTISKIDDING DEVICE.
APPLICATION FILED MAR. 26, 1918.
1,314,782.
Patented Sept. 2, 1919.
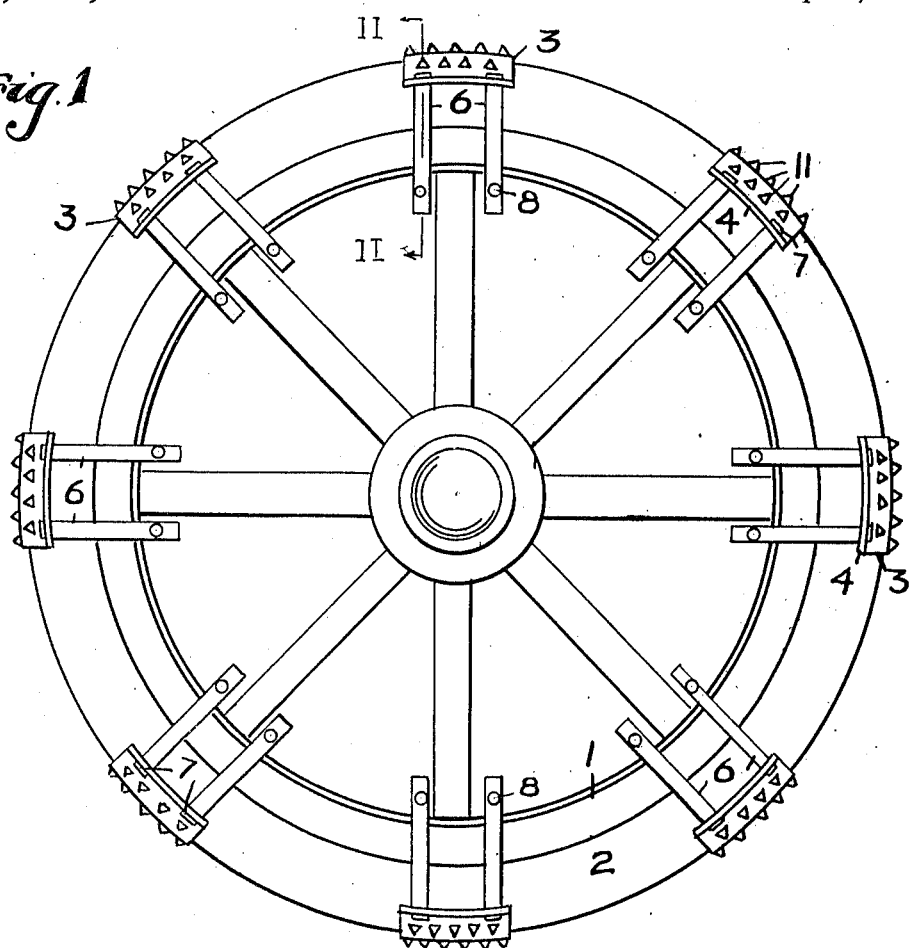
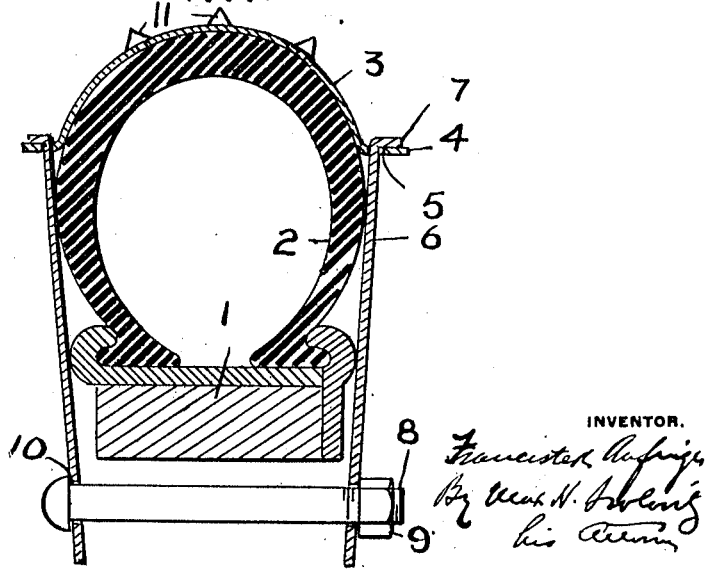

UNITED STATES PATENT OFFICE.

FRANCISTEK AUFINGER, OF BRADDOCK, PENNSYLVANIA.

ANTISKIDDING DEVICE.

1,314,782.　　　　Specification of Letters Patent.　　Patented Sept. 2, 1919.

Application filed March 26, 1918. Serial No. 224,865.

*To all whom it may concern:*

Be it known that I, FRANCISTEK AUFINGER, a citizen of the United States of America, residing at Braddock, in the county of Allegheny and State of Pennsylvania, have invented certain new and useful Improvements in Antiskidding Devices, of which the following is a specification.

This invention relates to anti-skidding elements for pneumatic and cushioned tires, and has for its object to provide a device of such class, in a manner as hereinafter set forth, capable of being conveniently positioned on the tire of a wheel for reducing skidding or sluing to a minimum during the travel of a vehicle.

Further objects of the invention are to provide an anti-skidding element for pneumatic tires which is simple in its construction and arrangement, readily attached and removed from the tire when occasion so requires, efficient in its use and inexpensive to manufacture.

With the foregoing and other objects in view this invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:

Figure 1 is an elevation of a pnuematic tire showing the adaptation therewith of a series of anti-skidding elements in accordance with this invention.

Fig. 2 is a section on line II—II, Fig. 1.

Referring to the drawings in detail 1 denotes the rim of a wheel, and 2, a pneumatic tire or known construction.

The anti-skidding device consists of a curved metal plate 3, conforming in curvature to the curvature of the tread of the tire 2. Each end of the plate 3, is formed with an outwardly projecting lateral flange 4, which is of a length equal to the width of the plate.

Near each end of each flange 4, an opening 5, is provided, and through which extends a metallic strip 6, the latter having its outer end formed to extend at right angles as at 7, and which rests upon the lower face of the flange 4.

The strips 6, are of a length to extend inwardly beyond the rim 1.

The strips 6, are arranged in pairs, the strips of each pair oppose each other, and the strips of each pair are connected together by a headed bolt 8, provided with a nut 9. The strips of each pair have alining openings 10, through which extend the bolts 8, and the latter are positioned inwardly, as well as extending transversely with respect to the rim 1.

Secured in the plate 3, are longitudinal rows of pointed studs 11. These latter project outwardly from the plate 3.

What I claim is:

An anti-skidding device for pneumatic tires including a metallic plate conforming in contour to the tread of the tire and having each side formed with a lateral flange extending at right angles with respect to the remaining portion of the plate, each of said flanges of the same length as the length of the plate and provided with a pair of openings, anti-skidding elements carried by said plate, strips extending through said openings and having right angular ends seated against said flanges, and means for connecting the strips together.

In testimony whereof I affix my signature in the presence of two witnesses.

FRANCISTEK AUFINGER.

Witnesses:
　MAX H. SROLOVITZ,
　LUELLA H. SIMON.